(12) United States Patent
Sellman et al.

(10) Patent No.: US 7,702,549 B2
(45) Date of Patent: Apr. 20, 2010

(54) SHARING OF STATE INFORMATION

(75) Inventors: Royston Sellman, Sheffield (GB); Russell Perry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1484 days.

(21) Appl. No.: 10/194,339

(22) Filed: Jul. 12, 2002

(65) Prior Publication Data

US 2003/0023494 A1    Jan. 30, 2003

(30) Foreign Application Priority Data

Jul. 27, 2001    (GB) ................... 0118451.4

(51) Int. Cl.
*G06Q 40/00*    (2006.01)
(52) U.S. Cl. ................ 705/35; 705/4; 705/23; 705/44; 705/1
(58) Field of Classification Search ............. 705/35–45, 705/1, 4, 23
See application file for complete search history.

(56) References Cited

U.S. PATENT DOCUMENTS

| | | | |
|---|---|---|---|
| 6,014,638 A | 1/2000 | Burge et al. | |
| 6,629,135 B1 * | 9/2003 | Ross et al. | 709/218 |
| 6,839,677 B2 * | 1/2005 | Mathur et al. | 705/1 |

FOREIGN PATENT DOCUMENTS

WO    WO00/63817    10/2000

\* cited by examiner

*Primary Examiner*—Richard C Weisberger

(57) ABSTRACT

The invention concerns a method of sharing state information. In the method, data presented to a user from a template file of a referring site of a distributed computer network is presented to the user in a style dictated by the referring site. During interaction between the user and the referring site, user entered data is captured at the referring site where it is used to modify data of the template file as part of a transaction. At a point in the transaction at which it is desired or required to transfer transaction data to a nominated site to further process the transaction, state information comprising both data from the template file and style data concerning the style of the referring site are transferred by the referring site to the nominated site. Thereafter, the nominated site when continuing processing of the transaction utilises the style data of the referring site.

11 Claims, 2 Drawing Sheets

SHARING OF STATE INFORMATION

The invention relates to the sharing of state information and in particular, but not exclusively, to providing a consistent look and feel to user related transaction data.

In the field of internet shopping, it is often necessary when making a purchase from a web site to transfer information during payment procedures from one web site to another and to transfer the user connection to a dedicated web page where payment or confirmation of payment is attended to.

When transferring the user connection, typically only transaction data relating to the essentials of the purchase being undertaken is transferred between the two web sites. Because only transaction data is transferred, the style of presentation of the transaction data to the user changes radically from the first site to the second site. This can have a disconcerting effect on the user in that in going from one presentation to another presentation the user may lose faith in the integrity (i.e. both the accuracy of the data and the security) of the purchase which he is about to undertake. Also, this change in presentation can throw the user so that the user may need to take some time in order to confirm that the data being presented to him in the new format is indeed the same data as he/she was intending to agree to. Such a variance in appearance of data can often mean that the user decides to terminate the transaction and the on-line sale is lost.

It will be appreciated that the site at which the payment transaction is to be confirmed (hereinafter referred to as the "nominated site") may typically be a site run by a dedicated financial server which may be linked to from the original site (hereinafter referred to as the "referring site") and which may serve as a payment site for many other shopping sites. Therefore, assuming the style of any one referring site at the nominated site for the presentation of data would not be a complete solution to this problem as each referring site linking to the nominated site will have its own presentation style.

It is a first aim of embodiments of the present invention to provide a means and method by which style information from a referring site may be preserved and presented to a user by a nominated site.

According to a first aspect of the invention, there is provided a method of sharing state information, wherein:

(i) data presented to a user in an on-line environment from a template file of a referring site of a distributed computer network is presented to the user in a house style dictated by the referring site;

(ii) during user interaction between the user and the referring site, user entered data is captured at the referring site where it is used to modify data of the template file as part of an on-line transaction;

(iii) at a point in the on-line transaction at which it is desired or required to transfer transaction data to a nominated site to further process the transaction, state information comprising both data from the template file and style data concerning the house style of the referring site are transferred by the referring site to the nominated site; and (iv) the nominated site when continuing processing of the transaction utilises the style data of the referring site.

The template file may comprise an intermediate XML template file. Preferably, the intermediate XML template file comprises a combination of an XML master template and user data.

Preferably, the house style is dictated by XML style language transformation (XSLT) processes.

Preferably, in step (iii) XML/XSLT documents defining both user entered/modified data and the style data concerning the house style of the referring site are transferred to the nominated site.

Preferably, in step (iv) the nominated site when continuing the processing of the transaction communicates with the user by presenting data concerning the transaction between the user and the referring site utilising the style data of the referring site.

In step (iv) data relating to the transaction between the referring site and the user may be presented to the user within a screen frame and, within that frame, style data of the referring site dictates the layout of the transaction data. Data presented to the user by the nominated site may further include data conforming to a house style of the nominated site and such data may be presented in other screen frames or windows, so as to provide a screen presentation to the user which has a first portion conforming to the house style of the referring site and a second portion conforming to the house style of the nominated site.

In connection with security during on-line shopping, it is also desirable to have some means in which there is a non-repudiable record of sale by which different parties in the transaction may add a digital signature to transferred data and create transactions in which clear commitments made by a user (e.g. customer), a referring site (e.g. an on-line merchant) and a nominated site (e.g. payment provider) may be made and recorded.

Preferably, in step (ii), the captured user data is stored in a format conforming to an XML schema agreed by both the referring and nominated sites.

Preferably, prior to transferring transaction data to the nominated site in step (iii) a user is asked to confirm that they desire to go ahead with the transaction. The user may be asked to confirm that they agree to transaction data and/or other user related data being transmitted by the referring site to the nominated site. Such confirmation may be added in the form of a digital signature by modifying data of the template file.

In step (iii) a digital signature may be added on behalf of the referring site to confirm that the referring site agrees with the terms of the on-line transaction.

The method may further comprise a step (v) in which the nominated site upon completion of a transaction with the user may add a digital signature to the transaction data to signify user acceptance of the agreement.

The method may further comprise a step (vi) in which the template file, modified by both the user and the nominated site and digitally signed by the user and/or on behalf of the nominated site is transferred to the referring site.

Preferably, the referring site is a web site of an on-line merchant. The nominated site may be a web site of a payment provider.

The referring site may be a web site which acts as a portal to access a plurality of alternative nominated sites, one of which may be selected (nominated) by the user for further processing of the transaction.

The method preferably includes provision for maintaining the integrity of transactions. In such a case, the nominated site may comprise a storage facility for data of completed and/or uncompleted transactions in which user data, transaction data, identification data relating to the identity of the referring site and house style data of the referring site may be stored. Data from the storage facility may also be retrieved by the referring site.

Such an independent facility for storing pending/incomplete transaction data may be very useful to internet traders as they can off-load the responsibility for maintenance of transaction data, but still retain the option of retrieving it. Furthermore, the fact that the XSLT documents are stored means that a regenerated transaction reflects the appearance of the site as it was at the time of the original interaction, rather than reflecting any changes made to the site in the intervening period.

For a better understanding of the invention, and to show how embodiments of the same may be carried into effect, reference will now be made, by way of example, to the accompanying diagrammatic drawings in which.

Figure 1:
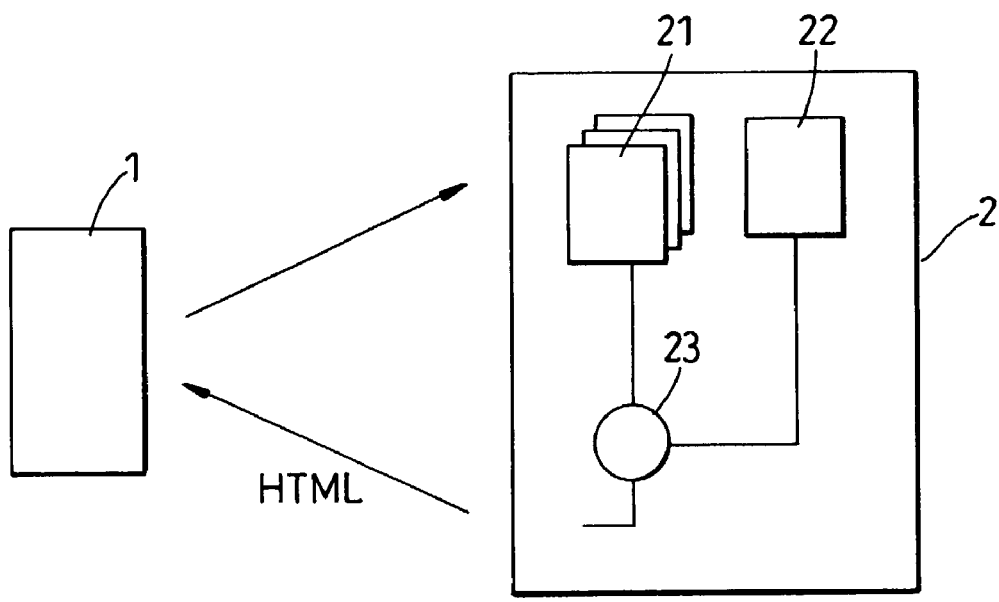
FIG. 1 illustrates the interactions between a user and a referring site utilising the methods of an embodiment of the present invention.

Referring now to FIG. 1, interactions between a user (e.g. a customer) and a referring site (for example an on-line shop) may take place in the context of the present invention.

A user will typically interact with an on-line shop utilising, for instance, a home PC 1 communicating with a web site 2 via the internet. Shown schematically, the customer sends requests R to the shopping web site 2 and receives web pages W from the web site 2 for display on the screen of his or her PC 1. The web pages W are in fact sent out in the form of mark-up language which the web browser of the customer PC then translates and displays to the user. The markup sent to the user by the web site 2 is constructed at the web site 2 by a transformation of XML (extensible mark-up language) template files by XML style language transformation processes. This is illustrated schematically in FIG. 1 which shows XML templates 21 and XML style language documents 22 being applied at a transformation stage 23 to convert XML to markup for sending to the user.

In simple terms, all of the data relating to the house style of the particular web site 2 is defined by the XML style language document 22, whereas the individual data objects and parameters etc., are defined in the XML templates 21.

In accordance with the teachings of the present invention, when a user fills out an on-line order form or similar concerning an on-line transaction, an XML template 21 containing the order form is modified according to user requirements and parameters are sent from the customer PC 1. The order form here may constitute a single XML template containing all of the relevant details, that template being modified according to the filled in information from the customer.

Figure 2:
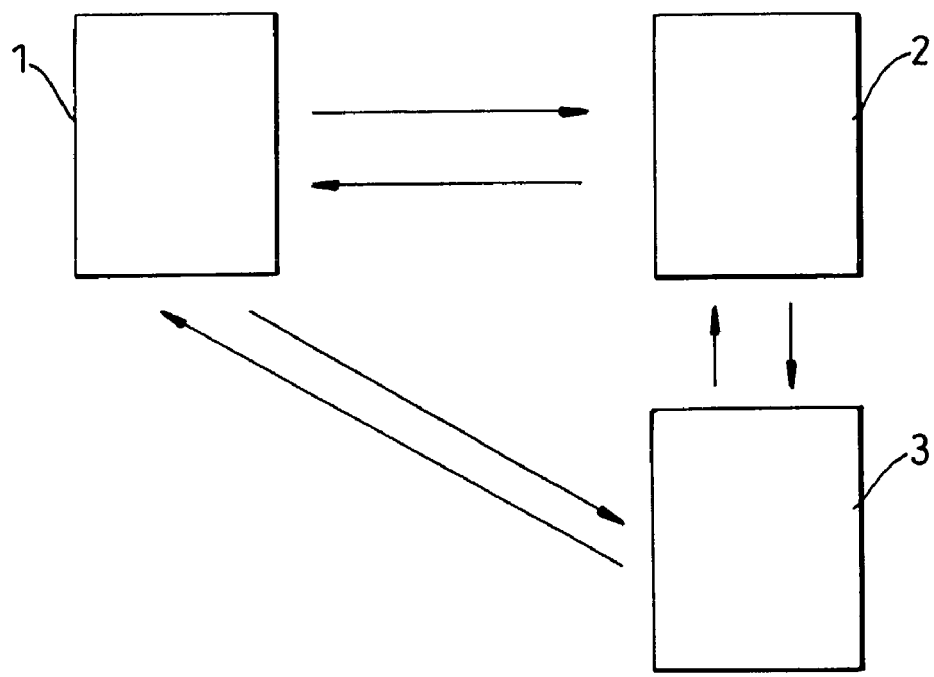
FIG. 2 illustrates interactions between a user, referring site and nominated site in an on-line transaction environment.

At some point in the transaction, it may be a requirement of the web site 2 to connect, either directly or indirectly, the user to a nominated web site 3 (referring now to FIG. 2). The nominated web site 3 may, for instance, be a web site belonging to a financial institution for the completion of payment formalities relating to an on-line transaction.

In prior art arrangements, raw transaction data concerning the transaction which has occurred between the user and the referring web site 2 would be transmitted to the nominated web site 3. This would result in the nominated web site 3 utilising that transaction data in order to process details of the transaction and would also result in the nominated web site 3 providing information back to the user 1 for confirmation of details regarding payment by the user. In such prior art arrangements however, the transaction data is presented utilising the look and feel dictated by a house style of the nominated web site 3. In contrast, in embodiments of the present invention, when state information is supplied to the nominated web site 3 by the referring web site 2, not only transaction data, but also style data is sent to the referring web site 3, defining a house style of the referring web site. Here, the style data in the form of the XSLT 22 and the transaction data in the form of a modified XML template 21 may be conveniently used by the nominated web site 3 to construct a frame or window for presentation to the customer PC in HTML format which will have the same look and feel as the screen presentations which the customer will be used to from his dealings with the referring web site 2. Other parts of the screen makeup presented to the customer by the nominated web site 3 may be in accordance with a house style of the nominated web site 3, so that the screen presentation may have a compound format reflecting both the house styles of the referring web site 2 and the nominated web site 3.

Because the user will be familiar with the layout received from the nominated web site 3, that user will have a higher perceived confidence in the accuracy of the data itself and in the security of the transaction.

As well as the advantages above, it will be apparent that as the data is effectively entered and stored by modifying an XML template 21, other data can be stored in or encoded into that modified template as desired. For instance, at the point at which a user, via the customer PC 1, is about to approve a given transaction, that user may be asked to check a particular box on the fill-in form, which will correspond to a particular field of the intermediate XML template 21. This box checking may be seen as adding a digital signature to the data to signal the user's approval. Similarly, the referring web site 2 may also add a digital signature to the XML template file 21, prior to passing that to the nominated web site 3. It will also be appreciated that this nominated web site 3 could further add its own digital signature when it has completed its side of the transaction. All this information could be visually conveyed to the user and the user may directly print out from the screen a receipt acknowledging agreements from the referring web site 2 (for instance, to provide goods) and from the nominated web site 3 (for instance, to honour payment). Further, the nominated web site 3 may issue a receipt to the referring web site 2 and generate a detailed printable record of the transaction.

Another convenient feature which is a benefit of using XML templates and transferring them between different web sites is the fact that private keys or public keys may be used as appropriate to decode or encode or authenticate all or parts of the document, such that some parts may be confidential to the customer 1, the referring web site 2 or the nominated web site 3 exclusively via a private key, whereas some parts may be accessible to two of the parties but not the third via a public key.

Figure 3:
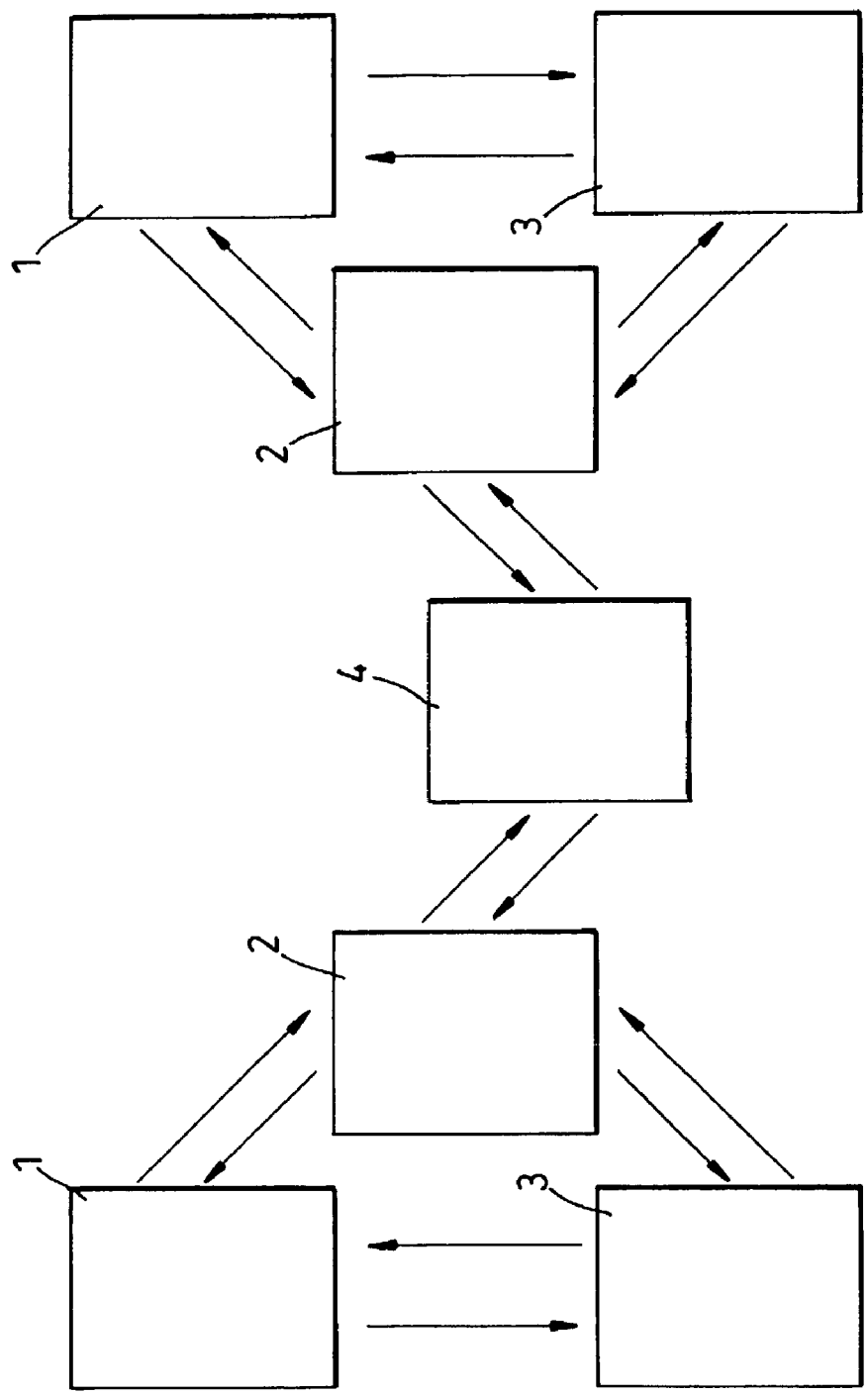
FIG. 3 illustrates how a storage facility may be utilised for the storage of data relating to incomplete transactions.

Referring now to FIG. 3, there is shown a situation in which the nominated web site may, for instance, be a repository for pending or uncompleted transactions.

Referring to FIG. 3, there is shown a plurality of customer PC's 1, a plurality of referring web sites 2, first nominated web sites 3 and a second type of nominated web site in the form of a repository 4.

The interactions between customer's PC's 1 and referring web sites 2 are generally the same as those interactions described in relation to FIG. 1 in that customers send requests and parameters from the customer's PC's 1 to a particular referring site 2 in order to initiate and carry out transactions. The referrers 2 may link with nominated sites 3 as described previously for the conduction of, for instance, financial parts of the transaction and these nominated sites 3 may also directly communicate with the customer PC's 1 as described previously.

At various points in the transaction, a customer may simply decide to abandon communications with the referring site 2

(for instance, by moving to a different web page) or they may decide to attach a pending status to the transaction so that the customer can then come back to the transactions later. In such cases, the repository 4 may be arranged to receive data of the incomplete transactions from the referring site 2. The repository 4 is arranged to receive both the transaction data from XML documents and the style data of XSLT documents via standard conversions and this transaction and style data may be encoded using a private key established between the referrer 2 and the repository 4. Storing uncompleted transactions in this manner may provide extra utility to the customer who may, upon re-establishing communication with the particular referring site 2 take up the incomplete transaction upon request.

Whilst preferred embodiments of the present invention have been discussed, it will be apparent to the man skilled in the art that many variations may be made within the scope of the invention. It will also be apparent that whilst XML and XSLT are particularly effective ways of transmitting transaction and style information, other mechanisms may be used. Also, whilst the examples have been directed towards an on-line shopping environment, it will be appreciated that the principles of the present invention may be applied to other environments.

The invention claimed is:

1. A method of sharing state information, wherein:
   (i) data is presented to a user from a template file in an extensible markup language that is adapted to contain style data and state data provided by a referring site hosted on a server on a distributed computer network;
   (ii) during user interaction between the user and the referring site, user entered data is captured at the referring site where it is used to modify state data of the template file as part of a transaction;
   (iii) at a point in the transaction at which it is required to transfer transaction data to a nominated site on the distributed computer network to further process the transaction, a digital signature confirming the referring site's agreement with the transaction, as defined by user-modified state data and the style data, is added on behalf of the referring site, and user-modified state data and style data from the template file are transferred at the behest of the referring site to the nominated site; and
   (iv) the nominated site when continuing processing of the transaction utilises the style data from the template file, wherein the nominated site comprises a storage facility for data of completed and/or uncompleted transactions in which user data, transaction data, identification data relating to the identity of the referring site and house style data of the referring site is stored.

2. The method of claim 1, wherein in step (iv) the nominated site when continuing the processing of the transaction communicates with the user by presenting data concerning the transaction between the user and the referring site utilising the style data of the referring site.

3. The method of claim 2, wherein in step (iv) data relating to the transaction between the referring site and the user is presented to the user within a screen frame and, within that frame, style data of the referring site dictates the layout of the transaction data.

4. The method of claim 3, wherein data presented to the user by the nominated site further includes data conforming to a house style of the nominated site and such data is presented in other screen frames or windows, so as to provide a screen presentation to the user which has a first portion conforming to a house style of the referring site and a second portion conforming to the house style of the nominated site.

5. The method of claim 1, wherein prior to transferring transaction data to the nominated site in step (iii), prompting for confirmation to go ahead with the transaction and adding a digital signature by modifying data of the template file.

6. The method of claim 5, wherein the method further comprises a step (v) in which the nominated site upon completion of a transaction with the user adds a digital signature to the transaction data.

7. The method of claim 6, further comprising a step (vi) in which the template file, modified by both the user and the nominated site and digitally signed by the user and/or on behalf of the nominated site is transferred to the referring site to signify user acceptance of the agreement.

8. The method of claim 1, wherein the template file comprises an intermediate XML template file.

9. The method of claim 8, wherein the intermediate XML template file comprises a combination of an XML master template and user data.

10. The method of claim 8, wherein a house style is determined by action of XML style language transformation (XSLT) processes on the style data in the intermediate XML template file.

11. The method of claim 10, wherein in step (iii) XML/XSLT documents defining both user entered/modified data and the style data concerning a house style of the referring site are transferred to the nominated site.

* * * * *